Nov. 30, 1965  A. S. RICHARDSON, JR  3,221,093
METHOD AND APPARATUS FOR DAMPING RELATIVELY LARGE AMPLITUDE
TYPE VIBRATIONS IN ELECTRIC POWER TRANSMISSION CONDUCTORS
AND OTHER OSCILLATING BODIES
Filed June 24, 1963  5 Sheets-Sheet 1
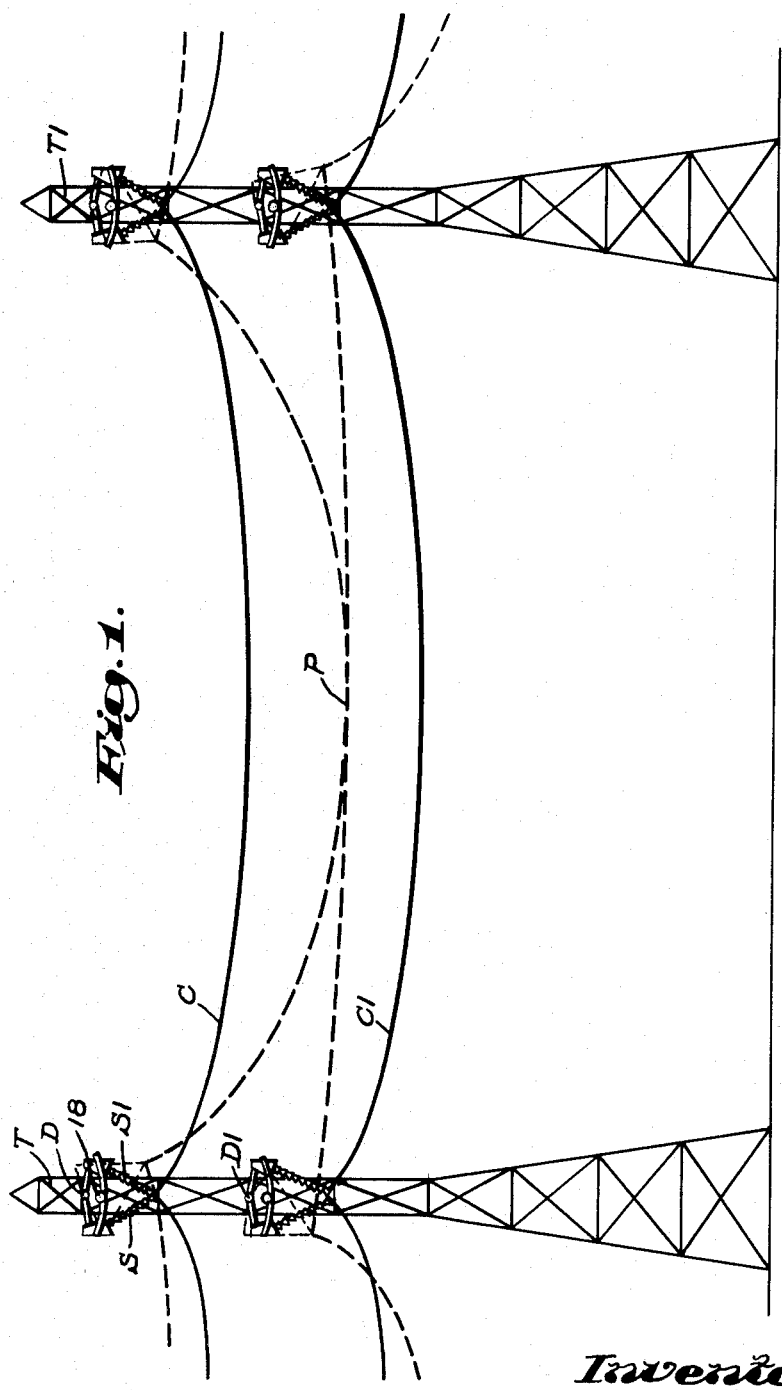

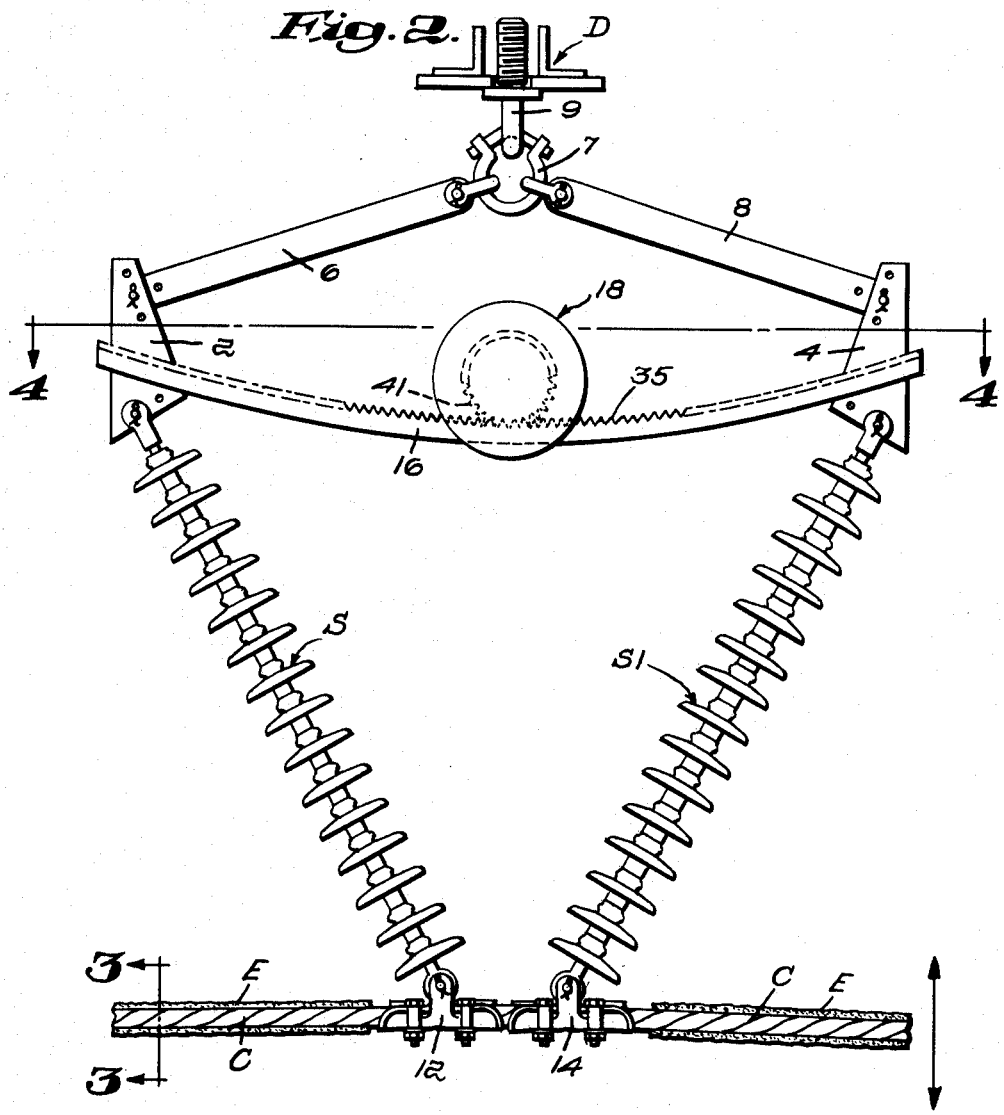

Nov. 30, 1965  A. S. RICHARDSON, JR  3,221,093
METHOD AND APPARATUS FOR DAMPING RELATIVELY LARGE AMPLITUDE
TYPE VIBRATIONS IN ELECTRIC POWER TRANSMISSION CONDUCTORS
AND OTHER OSCILLATING BODIES
Filed June 24, 1963                                   5 Sheets-Sheet 3
Fig. 8.
NATURAL FREQUENCY = f(R)
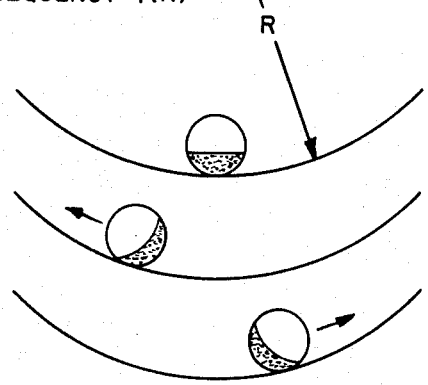
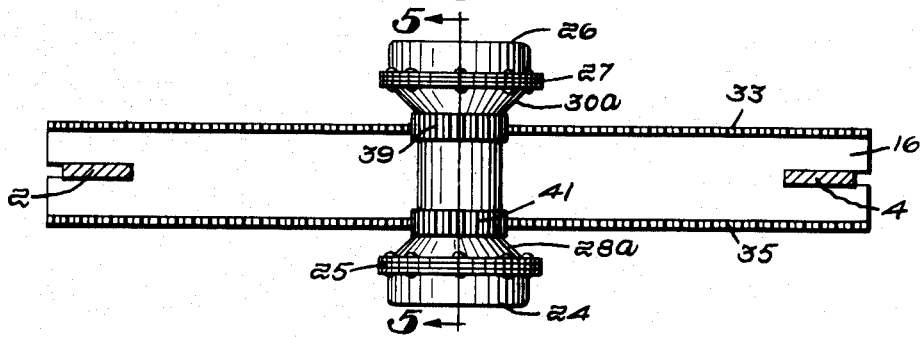
Fig. 4.
Fig. 5.
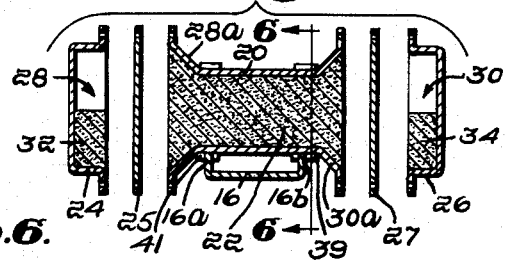
Fig. 6.
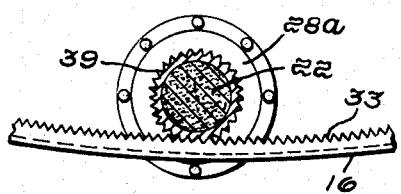
Inventor:
Albert S. Richardson Jr.

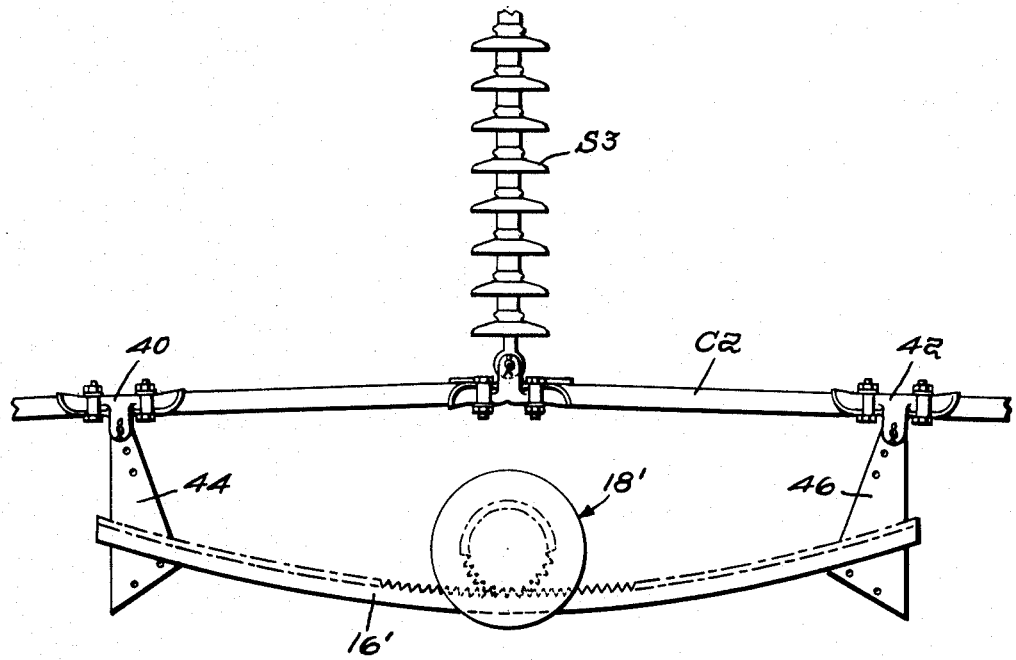

United States Patent Office 3,221,093
Patented Nov. 30, 1965

1

3,221,093
METHOD AND APPARATUS FOR DAMPING RELATIVELY LARGE AMPLITUDE TYPE VIBRATIONS IN ELECTRIC POWER TRANSMISSION CONDUCTORS AND OTHER OSCILLATING BODIES
Albert S. Richardson, Jr., 3 Wingate Road, Lexington, Mass.
Filed June 24, 1963, Ser. No. 289,982
7 Claims. (Cl. 174—42)

This invention relates to a method and apparatus for energy damping and dissipation and, more particularly, the invention is concerned with controlling relatively large amplitude type vibrations such as may develop in electric power transmission lines. These vibrations are commonly referred to as "galloping" and are produced by wind forces acting on nonsymmetrical icy coatings formed on conductors during sleet storms.

In a typical transmission line installation for some areas, power transmitting conductors are commonly supported in vertically spaced relationship on towers which may be spaced apart from one another at considerable distance as, for example, 500 to 1000 feet and more. Thus there occur unsupported spans of conductor bodies of considerable length. When these unsupported spans of conductor members become coated with irregularly shaped masses of ice or snow, as may occur during a sleet storm, and wind forces act on the ice coated members, relatively large amplitude oscillations may be induced. These oscillations or vibrations can develop to a point where a conductor at one level may come into physical contact with a conductor at another level. When this occurs the transmission line will automatically "trip out" due to the large current surges between phases.

If the trip outs persist, it may even become necessary to take the line out of service. This can be of serious consequence where the transmission line is supplying power to a city or to a large industrial plant. In addition, there is also the likelihood of the lines undergoing excessive strains and wear occurring as a result of the galloping.

A chief objective of the present invention is to deal with the problems indicated and to device a method and means for effectively damping vibrations and controlling galloping in power transmission lines. As one satisfactory means of accomplishing this objective, I have conceived of a method of making use of the tension changes which take place in power transmission conductors during galloping. I have determined that these changes may constitute a source of energy suitable for operating a special type of tensioning device. This special damping device when thus activated may, I find, function to extract energy from the vibrations for purposes of reducing amplitude.

In the invention method advantage is taken of the fact that tension changes in the conductors will produce changes in position or "swing" of the transmission line insulators, and from this swing of the insulators it becomes possible to set up a controllable system of opposing moments of forces to provide a novel damping effect.

In a preferred form of damping apparatus of the invention, I have devised a curved track member which is adapted to be mounted on a tower between two insulator strings and which is further adapted to support in rolling contact therewith a controllable weighting body. The weighting body is thus positioned to move with swing of the insulators. An important feature of the curved track member is the provision therein of an arc of curvature chosen with reference to the natural frequency of any given ice coated transmission line whose tension changes are to be utilized as above set forth.

2

A further important feature of the method is to provide negative phasing of the moments of forces induced. This is accomplished by using in the controllable weighting member a mass of loosely disposed material which, as rolling movement of the weighting member occurs, shifts about in a predetermined timed relationship, to provide downwardly directed weighting for developing maximized opposing moments of forces about an immediately adjacent point of suspension of the power line whereby significant vibration damping is realized.

The nature of the invention and its other objects and novel features will be more fully understood and appreciated from the following description of a preferred embodiment of the invention selected for purposes of illustration and shown in the accompanying drawings, in which:

FIGURE 1 is an elevational view illustrating diagrammatically a typical power transmission line and supporting towers with which the energy damping of the apparatus of the invention is associated;

FIGURE 2 is another elevational view of the damping device of the invention shown on a somewhat larger scale with a portion of a conductor suspended therefrom;

FIGURE 3 is a cross section taken on the line 3—3 of FIGURE 2;

FIGURE 4 is a plan cross section taken on the line 4—4 of FIGURE 2;

FIGURE 5 is a cross sectional view taken approximately on the line 5—5 of FIGURE 4;

FIGURE 6 is a detail cross sectional view taken on the line 6—6 of FIGURE 5 showing portions of the damping components and also indicating serrated edges formed thereon;

FIGURE 7 is a diagrammatic view illustrating several different positions assumed b ythe damping apparatus of the invention;

FIGURE 9 is an elevational view showing a modified form of the invention.

Figure 8:
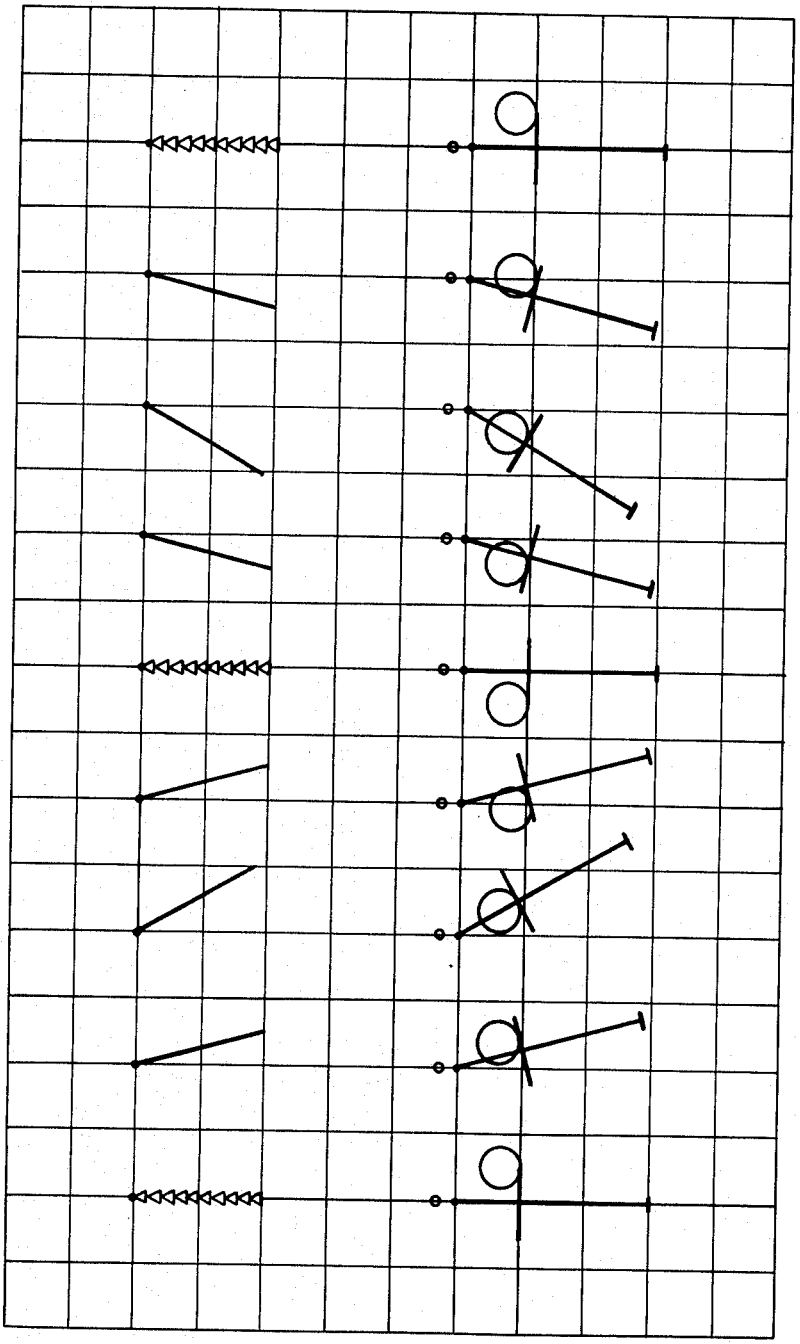
FIGURE 8 is another diagrammatic view illustrating further changes in position of the damping device.

Referring more in detail to the structure shown in the drawings, and in particular FIGURE 1, T and T1 denote conventional tower structures used to support power transmission conductors as C, C1, etc. As is customary in power structures of this class, there may be provided cross arms D and D1 transversely fixed to the tower at different heights and the usual practice is to suspend the conductors C, C1 from insulator bodies as S, S1 which are attached at their upper ends to the cross arm extremities.

As earlier pointed out, the conductors may, during a sleet storm for example, take on nonsymmetrical coatings of ice E as suggested in FIGURE 3 and wind forces may then cause the ice coated conductors C and C1 to vibrate sufficiently for them to come together at point P as indicated in FIGURE 1 by the broken line showing.

The method of the invention as shown in FIGURES 1 to 8 inclusive controls the vibrations and prevents the conductors from coming together by creating opposing moments of forces which may be exerted at one or more of the points of suspension of the conductors. These moments of forces are preferably generated at a point of origin lying between the insulator bodies and the respective cross arm portions to which they are attached. The method further provides for regulating the phasing of the moments of forces by use of a controllable weighting material which will provide for a correct negative phasing.

The structure shown in the drawings constitutes one preferred form of apparatus which may be used for carrying out the method of the invention. However, it should be understood that the invention is not intended to be limited to this specific structure nor to the detailed description thereof as hereinafter set forth and other arrangements may be employed.

In this preferred embodiment of the invention, I provide a special form of insulator assembly in which two angularly depending insulator strings S and S1 are attached to gusset plates 2 and 4 which are in turn rigidly bolted to spreader rods 6 and 8. The rods are pivotally suspended from a clevis 7 linked into an eye bolt 9 secured to a cross arm extremity indicated at D. The angularly disposed insulator strings S and S1 are secured by suitable clamping means 12 and 14 to the conductor C.

It will be observed that with the arrangement described any tension change acting axially in conductor C will produce a displacement of the insulator strings S and S1 causing a swinging motion as suggested by dotted lines in FIGURE 1 and if this tension change occurs at a natural frequency of oscillation of the conductor when coated with ice, the insulator strings will swing back and forth correspondingly in some arc of travel.

In accordance with the invention, I combine with these angularly depending insulator strings a special track member 16 which extends between the insulator strings and which may be supported by the gusset plates 2 and 4 as shown in FIGURE 2. The track member is curved in the manner indicated. I further provide a controllable weighting member generally indicated by arrow 18 which is supported for rolling movement along the track 16. By means of this arrangement any swing induced in the insulator strings will cause the weighting member 18 to move back and forth along the track.

As shown in FIGURE 4, the controllable weighting member may include a hollow central cylindrical body 20 which is completely filled with a weight comprised, for example, by a mass 22 of sand or other suitable material. At either end of the cylindrical body 20 are outer cylinder container portions 24 and 26 separated from body 20 by walls 25 and 27 to define respective volumes 28 and 30. In these volumes are contained small quantities of sand 32 and 34.

It is pointed out that by this arrangement the volumes 28 and 30 are isolated from the central cylindrical member 20 and it will also be observed that the weighting sand bodies 32 and 34 occupy only parts of the spaces comprised by the volumes 28 and 30. Thus rolling movement of the weighting member 18 will cause the sand masses 32 and 34 to shift from one point to another and to move up around the curved walls of the portions 24 and 26. Displacement of sand is suggested diagrammatically in FIGURE 8. As these displacements of sand occur, downwardly exerted weighting will take place in accordance with the total weights involved and the particular positions assumed at any given point by the shiftable weight masses 32 and 34 to thus set up variable moments of forces about the suspension points of the conductor.

It will be observed that the construction of the cylindrical bodies and the track 16 must take into consideration possible side sway of the insulators due to wind force and presence of ice and it will be seen that the outer cylindrical portions are joined to cylindrical body 20 by means of tapered surfaces 28a and 30a and these tapered surfaces in effect constitute guide rails for maintaining the weighting body 18 on the rail portions 16a and 16b of channelled track 16 as illustrated in FIGURE 5.

It is important to maintain the weighting member in rolling motion rather than sliding movement such as might occur if the track becomes heavily iced. For those conditions where ice may occur, I further provide ice removing means consisting of serrated surfaces 33 and 35 formed on the rails of the track 16 and similarly shaped teeth 39 and 41 are formed on the cylinder body 20. These elements function to apply crushing forces from the weight of the sand in the container and thus operate to break up and dislodge icy coatings on the track in a desirable manner.

In constructing the variable weight member 18 and supporting track 16 in a manner suitable for more efficiently generating opposing moments of forces of significant value, it is important, I find, to have regard for the galloping frequency at which a given conductor may be expected to vibrate and to provide a curvature in the track 16 which is chosen with reference to the galloping frequency in order to obtain a maximum cylindrical travel.

It has been determined that natural frequencies of ice coated conductors of the class indicated are in the order of one cycle every six seconds which corresponds to a pendulum length equal to about 30 feet. This would be a required radius of curvature R of the curved track 16 as indicated diagrammatically in FIGURE 3 to provide maximum motion of the member 18 at that frequency.

This relationship is also stated as follows. The natural frequency of an ice coated transmission line is equal to $$\frac{1}{2\pi}\sqrt{\frac{32.2}{R}}$$

where R is the radius of curvature of the track.

Another even more important consideration in constructing the weight member 18 and track 16 is to not only provide sufficient weight to maintain the member 18 on the track, but also to provide for negative phasing (FIGURE 7). This I have determined may be accomplished by using the partly filled volumes 28 and 30 in which are contained shiftable material 32 and 34. When the materials 32 and 34 are constituted of a loose dry material, such as sand, and employed in suitable quantities, it is possible to have the motion of the cylinder lag the insulator motion by a phase angle of 90° (FIGURE 7). It is this phase lag which makes possible negative phasing so that moments of forces may be exerted by the controllable weighting member 18 to oppose the moments of forces of the conductor as it oscillates.

It will be understood that the phase lag is controlled by the quantity of sand present because the sand tends to ride up on the wall of the cylindrical container in accordance with the direction of motion as shown in FIGURE 8. The extent or degree of this shifting sand movement is a factor of the amount used and for this reason must be chosen with regard to the particular requirements at hand in any given instance.

In the preferred embodiment shown, therefore, the curved track 16 is constructed with reference to conductor galloping frequency and serves to support the weight member 18 so that it rolls back and forth on the track at the galloping frequency specified. The quantity of sand in the volumes 28 and 30 is regulated to provide negative phasing or a phase angle of 90° between motion of the weighing member and the insulator swing. Finally, the total amount of sand is chosen to give a maximum retarding effect to the transmission line oscillation.

Having in mind a natural frequency vibration wherein the conductor displacement may be as much as 15 or 20 feet at point P (FIGURE 1), an installation which will provide excellent damping includes an inner cylinder volume filled with approximately 70 pounds of sand, and two outer volumes containing approximately 30 pounds each of sand, making a total weight of 130 pounds. Approximately one-half of the total weight will, therefore, be shiftable with rolling motion.

I may also desire to modify the structure shown in FIGURES 1 to 8 in various ways. For example, I may utilize an insulator string assembly such as that shown in FIGURE 9. In this arrangement conductor C2 is supported between towers as described above and has a single insulator string as shown in FIGURE 9. At either side of the insulator string S3 on the conductor C2 are clamping members 40 and 42 from which depend gusset plates 44 and 46. Secured between the gusset plates 44 and 46 is a track member 16' having a weighting member 18' mounted for rolling motion thereon.

I may also desire to utilize other forms of controllable weight members such as spring-loaded devices which are responsive to change in tension in the conductor members. I may also desire to use other forms of rolling bodies such as spherical shaped bodies and others and I may further desire to vary the construction and shape of the supporting track body in various ways. I may also utilize the damping method of the invention in other oscillating systems such as in boat vibrations and the like.

While I have disclosed the above-noted preferred forms in the invention, it will be understood that various other changes and modifications may be practiced within the scope of the appended claims.

I claim:

1. In an electric power transmission line installation which includes tower means having cross arms supported thereon and a power transmission conductor line extending between the tower means, and combination of a transmission line suspension member depending from each of said cross arms, an insulator body pivotally attached to each of said suspension members, curved track means supported with the insulator bodies for movement therewith, the lower extremities of the insulator bodies being conducted to the transmission conductor line, a container member disposed on said track means and arranged for rolling movement on said track means and having therein a mass of shiftable weighting material for movement in said container during rolling movement of said container on said track means, said container and said shiftable weighting material being responsive to induced oscillations of the transmission line to move back and forth along the curved track means and thereby produce moments of forces which oppose moments of forces of the oscillations in the power line.

2. In a damping device for a body supported in a medium in which it is free to oscillate, said damping device comprising a curved track secured to said body for movement in the direction of the oscillations of said body, a container disposed on said track for rolling movement therealong in response to the movement of the track, and a weighted granular mass in said container, said weighted granular mass being shiftable during travel of said container on said track to a position with its center offset from the center of rotation to produce opposing moments of force with respect to the rotation of said container.

3. In an electric power transmission line installation which includes tower means having cross arms supported therefrom and a power transmission conductor line extending between the tower means, the combination of transmission line suspension members depending from each of said cross arms, insulator bodies pivotally attached to said suspension members, curved track means supported by said suspension members and between said insulator bodies for movement therewith, the lower extremities of said insulator bodies converging and being connected to the transmission conductor line at closely adjacent points, a container member disposed on said track means and arranged for rolling movement on said track means and having therein a mass of shiftable weighing material for movement in said container during rolling movement of said container on said track means, said container and said shiftable weighting material being responsive to induced oscillations of the transmission line to move back and forth along the curved track means and thereby produce moments of forces which oppose moments of forces of the oscillations in the power line.

4. A structure as defined in claim 2 in which the container is formed with a plurality of enclosed volumes at least two of which are only partially filled with the mass of shiftable weighting material.

5. A structure as defined in claim 2 in which the curved track and corresponding mating surfaces of the container are formed with serrations for crushing and dislodging icy coatings forming thereon.

6. A structure as defined in claim 2 in which the insulators occur in two depending spaced apart insulator strings and the weight supporting element extends above the insulator strings.

7. A structure as defined in claim 2 in which the insulator bodies occur in a single insulator string and the weight supporting element extends in a substantially horizontal position below the insulator string.

References Cited by the Examiner

UNITED STATES PATENTS

| | | | |
|---|---|---|---|
| 1,675,391 | 7/1928 | Stockbridge | 174—42 |
| 1,965,494 | 7/1934 | Goodrich | 174—42 |
| 2,215,541 | 9/1940 | Buchanan et al. | 174—42 |

FOREIGN PATENTS 909,141  11/1945  France.

JOHN F. BURNS, *Primary Examiner.*

LARAMIE E. ASKIN, *Examiner.*